US010922693B2

(12) United States Patent
Kulshreshtha

(10) Patent No.: US 10,922,693 B2
(45) Date of Patent: Feb. 16, 2021

(54) SYSTEM AND METHOD FOR MOBILE DEVICE LIMITS

(71) Applicant: JPMorgan Chase Bank, N.A., New York, NY (US)

(72) Inventor: Ankur Kulshreshtha, Newark, DE (US)

(73) Assignee: JPMORGAN CHASE BANK, N.A., New York, NY (US)

(*) Notice: Subject to any disclaimer, the term of this patent is extended or adjusted under 35 U.S.C. 154(b) by 797 days.

(21) Appl. No.: 14/842,894

(22) Filed: Sep. 2, 2015

(65) Prior Publication Data
US 2017/0061433 A1    Mar. 2, 2017

(51) Int. Cl.
| | |
|---|---|
| *G06Q 20/20* | (2012.01) |
| *G06Q 20/40* | (2012.01) |
| *G06Q 20/12* | (2012.01) |
| *G06Q 20/36* | (2012.01) |
| *G06Q 20/32* | (2012.01) |
| *G06Q 20/38* | (2012.01) |

(52) U.S. Cl.
CPC ........... *G06Q 20/405* (2013.01); *G06Q 20/12* (2013.01); *G06Q 20/20* (2013.01); *G06Q 20/322* (2013.01); *G06Q 20/385* (2013.01)

(58) Field of Classification Search
CPC .... G06Q 20/00; G06Q 20/105; G06Q 20/405; G06Q 20/35785; G06Q 20/367; H04L 67/18; H04L 63/0823
USPC ......................................................... 705/44
See application file for complete search history.

(56) References Cited

U.S. PATENT DOCUMENTS

| | | | |
|---|---|---|---|
| 6,993,658 B1 | 1/2006 | Engberg et al. | |
| 8,583,554 B2* | 11/2013 | Dooley Maley | ....... G06Q 40/00 705/41 |
| 8,682,802 B1* | 3/2014 | Kannanari | ........... G06Q 20/367 705/65 |
| 8,893,250 B2* | 11/2014 | Mattsson | ............. G06Q 20/405 726/9 |
| 9,680,942 B2* | 6/2017 | Dimmick | ............ H04L 63/0823 |
| 2002/0198848 A1 | 12/2002 | Michener | |

(Continued)

FOREIGN PATENT DOCUMENTS

EP    2869254    5/2015

OTHER PUBLICATIONS

International Search Report and Written Opinion issued in International Application No. PCT/US16/049670, dated Nov. 4, 2016.

(Continued)

*Primary Examiner* — Clifford B Madamba
(74) *Attorney, Agent, or Firm* — Greenberg Traurig LLP

(57) ABSTRACT

Exemplary embodiments provide methods and systems for configuring spending or credit limits for individual mobile devices for the same account, such as a credit card account. The spending limits may be configured by the primary account holder through a website or mobile application. A token id is set on the mobile device that corresponds to the account. The token id is unique for the individual mobile device During a mobile payment transaction, the token id is mapped back to the corresponding account and the available spending limit is evaluated with respect to the transaction. Based on this evaluation, an approval or denial for the transaction is generated.

14 Claims, 4 Drawing Sheets

(56) References Cited

U.S. PATENT DOCUMENTS

| | | |
|---|---|---|
| 2008/0103984 A1 | 5/2008 | Choe et al. |
| 2009/0260064 A1 | 10/2009 | McDowell |
| 2011/0184866 A1 | 7/2011 | Shakkarwar |
| 2012/0197794 A1* | 8/2012 | Grigg .................. G06Q 20/105 705/41 |
| 2014/0236813 A1 | 8/2014 | Brabson et al. |
| 2015/0088741 A1 | 3/2015 | Lyman |

OTHER PUBLICATIONS

Notification Concerning Transmittal of International Preliminary Report on Patentability issued in International Application No. PCT/US16/049670, dated Mar. 15, 2018 (7 pages).

Communication with Extended European Search Report issued in corresponding Application No. 16842887.8, dated Mar. 1, 2019.

* cited by examiner

SYSTEM AND METHOD FOR MOBILE DEVICE LIMITS

FIELD OF THE VARIOUS EMBODIMENTS

The present disclosure generally relates to mobile payments. Specifically, the various embodiments relate to secure authorization limits for individual mobile devices registered for mobile payments with the same account.

BACKGROUND

Many financial institution customers have more than one mobile device that is tied to the same account and used for mobile payments. Currently, there is no way to configure individual device spending limits for mobile payments.

These and other deficiencies exist.

SUMMARY OF THE VARIOUS EMBODIMENTS

An exemplary embodiment includes a computer-implemented method having the steps of: setting a token id, corresponding to a payment account, on each of two or more mobile devices associated with an account holder; receiving a configuration, from the account holder, of an account spending limit for at least one mobile device of the two or more mobile devices; associating the account spending limit with the token id that is set on the at least one mobile device; receiving a transaction request, including an amount and the token id, from a merchant; identifying which mobile device of the two or more mobiles devices is used for the transaction based on the token id; determining whether the configured account spending limit is associated with the identified mobile device; upon determining the configured account spending limit for the mobile device, comparing the transaction request amount against the configured account spending limit; authorizing the transaction request upon the transaction request amount being less than the configured account spending limit; and denying the transaction request upon the transaction request amount exceeding the account spending limit.

Another exemplary embodiment includes a computer-implemented method having the steps of: receiving a configuration, from the account holder, of an account spending limit for at least one particular mobile device of two or more mobile devices, wherein the account spending limit is associated with a payment account; and associating the account spending limit with a token id that is set on the particular mobile device.

Another exemplary embodiment includes a computer-implemented method having the steps of: receiving a transaction request, including an amount and a token id, from a merchant; identifying a particular mobile device used for the transaction request based on the token id; identifying an account spending limit associated with the particular mobile device wherein the account spending limit was configured by an account holder prior to the transaction request; comparing the transaction request amount against the account spending limit for the particular mobile device; authorizing the transaction request upon the transaction request amount being less than the account spending limit; and denying the transaction request upon the transaction request amount exceeding the account spending limit.

In various exemplary embodiments, the preceding methods may be performed using a system with at least one processor and a memory comprising computer-readable instructions which when executed by the processor cause the processor to perform the method steps.

These and other embodiments and advantages will become apparent from the following detailed description, taken in conjunction with the accompanying drawings, illustrating by way of example the principles of the various exemplary embodiments.

DETAILED DESCRIPTION OF THE PREFERRED EMBODIMENTS

Figure 1:
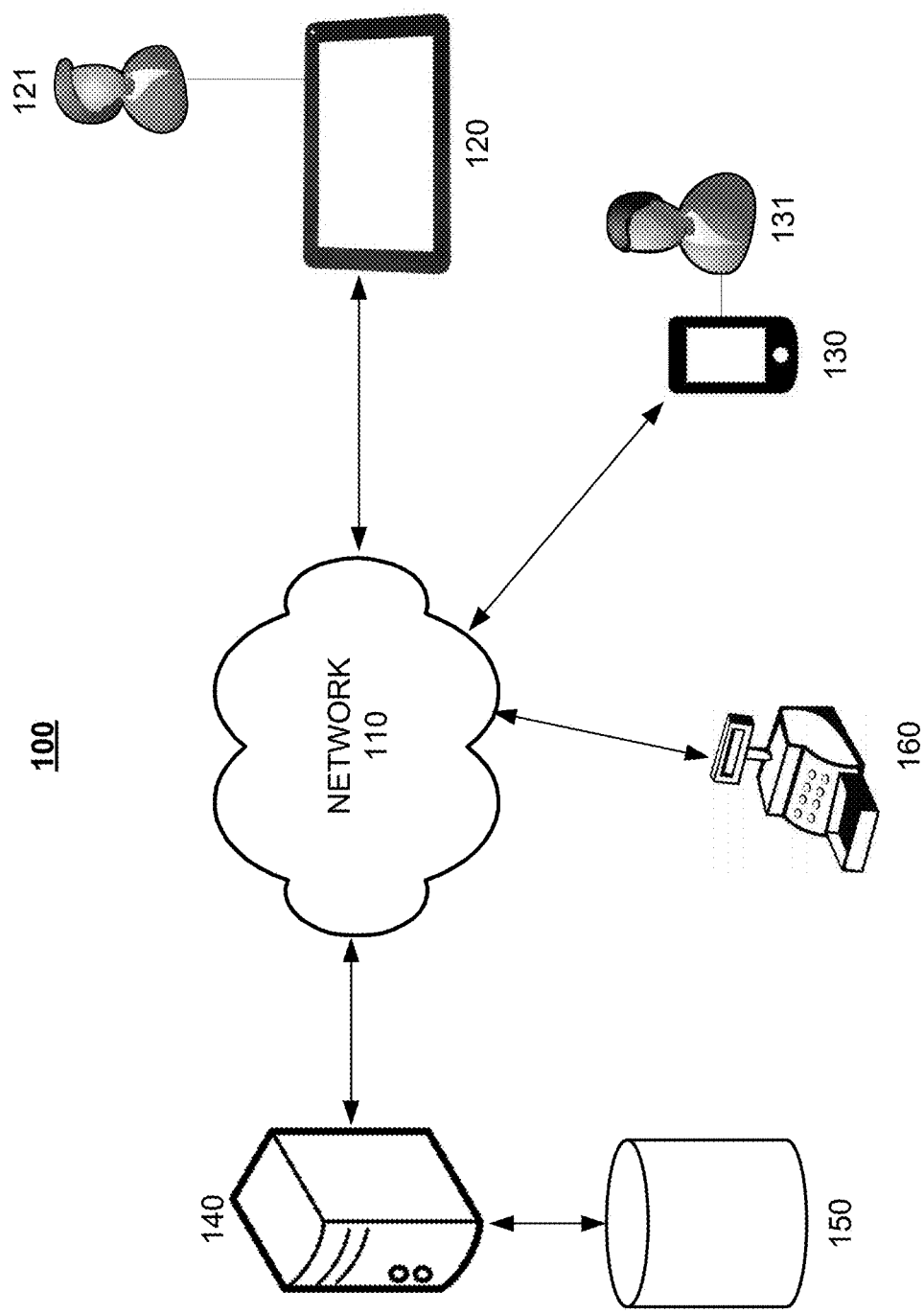
FIG. 1 is a diagram of a system in accordance with an exemplary embodiment.

It will be readily understood by those persons skilled in the art that the embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. While the various exemplary embodiments are described in the context of using mobile devices and mobile applications, the methods and systems described herein may be applied to other related services involving interaction with similar devices.

The following descriptions provide different configurations and features according to exemplary embodiments. These configurations and features may relate to using mobile device for financial transactions, such as mobile payments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the various embodiments. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

"Mobile device" or "portable electronic device" as used herein, may include portable computing and communications devices including, but not limited to, mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These mobile devices may communicate, and/or transmit/receive data, over wireless networks, including cellular networks. A mobile device may have one or more applications installed. In various embodiments, the installed applications may be a mobile application associated with a financial institution and/or a mobile payment application. The mobile device may be capable of supporting and/or conducting a mobile payment.

The term "financial institution," as used herein, may include institutions that provide financial services to their members or customers. Financial institutions may include, but are not limited to banks, credit unions, trust companies, mortgage loan companies, insurance companies, investment banks, underwriters, and brokerage firms. The use of the term "financial institution" herein is meant to be exemplary and non-limiting.

The term "customer," as used herein, may refer to an individual who holds at least one payment account with a financial institution. For example, the customer may have one or more credit accounts with a financial institution. Each payment account may have a physical payment device associated therewith. For example, a card or other physical token may be associated with the payment account allowing the payment account to be used for transactions. In various embodiments, the payment account may have a virtual card or token associated therewith for use in cardless transactions. It should be appreciated that while the various embodiments are described in terms of a credit account, this is meant to be exemplary and non-limiting, as other types of accounts can be used with the various embodiments. For example, a debit account can be used.

The term "payment token," "token," or "token id," as used herein, means an identifier that points to a payment account or mechanism, such as a credit or debit account. The token may be tied to a specific one of a customer's available payment accounts (e.g., credit, debit, etc.). The token may consist of a token id. Stated differently, the token is a credential associated with a payment account. The token may be provisioned by the financial institution (or by a third party) to a particular mobile device. The token is stored on the mobile device. The token may be securely stored. Each mobile device may have a unique token (token id) associated therewith. For example, two different mobile devices may have the same credit account associated therewith but have different tokens to account for the devices being different. This enables exemplary embodiments to distinguish between different mobile devices, even those associated with the same account. The token may be bound to the particular mobile device.

In various embodiments, the token may be stored in a secure element on the mobile device. The token may take various forms. In various embodiments, the token may be in the form of a PAN (payment account number) that is processable across the rails (i.e., the existing payment channels) of VISA or MASTERCARD, for example, as part of a transaction. For example, the payment token may be in the form of a 16 digit number. In various embodiments, the token may include the last four digits of the card account number. In various embodiments, the token may have an expiration date. For example, the token expiration can be tied to the expiration date of a physical card associated with the payment account. In various embodiments, the expiration may be shorter than the expiration date of the physical card.

According to exemplary embodiments, only the token is stored on the device and not the actual credit card number or associated account number. That is, the token itself is merely an identifier that by itself is meaningless. Since the token is bound to the particular mobile device, the token issuer is able to map the token to a particular account. Thus, if the device is lost or stolen, the token can be cancelled and the account information is left intact and safe. A new token can be provisioned to the device and associated with the account.

Exemplary embodiments may address problems with present systems. Example problem 1: kids using a mobile device can download applications, such as games or educational software. The kids can use their parents credit card account through a mobile application or through direct use of the credit card. The parents cannot set-up limits on the particular mobile device being used by the kids to control the kids spending. In other words, the entire available credit limit of the credit card account is available to the kids. Example problem 2: An individual may not be comfortable putting a credit card with a high credit limit onto a web or mobile based software store or marketplace since there is no way to restrict authorization amounts for the card with the merchant.

Exemplary embodiments provide systems and methods for setting and management of authorization limits, such as spending limits, for different mobile devices using the same payment account, such as a credit account. Exemplary embodiments may use tokenization to control credit limits on individual mobile devices. One payment account can be put on file (i.e., with the financial institution or other third party) for a set of mobile devices. The payment account can be used for mobile payments using a mobile device. Using tokenization, a unique "token id" or "token" is created for each device that the payment account is provisioned to or stored on. The token id may be generated by the financial institution or a third party. Thus, the token id is unique to each account and each device. Each token id is mapped to the payment account number or mapped to the account and the particular mobile device. The primary account holder may access an interface on a mobile device through a mobile application and a website account (e.g., a mobile application provided by a financial institution that is installed on a mobile device or through a secure website associated with the financial institution). The interface may allow the primary account holder to view all the devices where the payment account has been stored or that have been associated with the account. The primary account holder may configure a spending limit for each token id since each token id is unique the account and the device. When an authorization request is received from a device, an authorization engine checks the spending limit configuration to see if one has been set.

The primary account holder may be able to remove/suspend particular token id's from any device using the mobile application or website access. In various embodiments, a default spending limit may be associated with the account and applied to all mobile devices. In the absence of setting a different spending limit for a device, the default limit may be applied. The default limit may be a credit or spending limit associated with the credit or debit account.

During a transaction, the mobile device provides the token to the point of sale. In various embodiments, the customer may enter the token number into a terminal or website. The point of sale (or terminal) sends the token (token id), as well as transaction information, over a network to the financial institution as part of a transaction authorization request. The transaction information may include the amount of the transaction. The transmission may be routed via a payment processor. The financial institution may process the received token and transaction information. The processing may including mapping the token to an account. The financial institution may evaluate any spending limits associated with the account for the particular mobile device. If the transaction amount does not exceed the limit, the financial institution may provide authorization for the transaction over the network. If the transaction amount does exceed the limit, then the financial institution may decline or deny the transaction.

In various embodiments, an override capability may be provided. In the event the transaction is denied because exceeding a set spending limit, a code may be entered into the mobile device (such as into the mobile application), and the token resent to the point of sale. A new authorization request may be sent to the financial institution. The override code may be included with the token. The new request would then be processed by the financial institution may be processed and evaluated against the limit for the account itself instead of against the mobile device specific spending limit.

Referring to FIG. 1, a schematic diagram of a system 100 is shown, according to an exemplary embodiment. As illustrated, network 110 may be communicatively coupled with one or more data devices including, for example, tablet computing device 120, smart phone device 130, server 140, database 150, and point of sale device 160. The devices 120 and 130 may be associated with customers 121 and 131, respectively. The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 110 may be a wireless network, a wired network or any combination of wireless network and wired network. For example, the network 110 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 110 may support an Internet network, a wireless communication network, a cellular network, Bluetooth, or the like, or any combination thereof. The network 110 may further include one, or any number of the exemplary types of networks mentioned above operating as a stand-alone network or in cooperation with each other. The network 110 may utilize one or more protocols of one or more network elements to which it is communicatively coupled. The network 110 may translate to or from other protocols to one or more protocols of network devices. Although the network 110 is depicted as one network for simplicity, it should be appreciated that according to one or more embodiments, the network 110 may comprise a plurality of interconnected networks, such as, for example, a service provider network, the Internet, a cellular network, corporate networks, or even home networks, or any of the types of networks mentioned above.

Data may be transmitted and received via network 110 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

In various embodiments, network 110 may be any suitable network, including the Internet, payment networks (e.g., Visa, MasterCard, American Express, private label, closed loop/over-the-top, bank networks, ACH, etc.). Other networks, including communication networks, payment networks, combinations thereof, etc. may be used as is necessary and/or desired.

While FIG. 1 shows a single tablet device 120, smartphone device 130, server 140, database 150, and point of sale device 160, it should be appreciated that there may be several of such devices to carry out the various exemplary embodiments. Furthermore, the tablet device 120 and the smartphone device 130 are meant to be exemplary mobile devices. The point of sale device 160 is meant to be an exemplary point of sale device. Other mobile devices and point of sale devices may be used in the system 100. Multiple mobile devices and point of sale devices may be used.

The tablet device 120 may be associated with a customer 121. The customer 121 may have one or more accounts with a financial institution. For example, the customer 121 may have one or more credit accounts with the financial institution. The tablet device 120 may alternatively be a laptop computer, a personal digital assistant, a smartphone, a smartwatch, smart glasses, or other computing devices capable of sending or receiving network signals. The tablet device 120 may have an application installed that is associated with the financial institution. For example, the tablet device 120 may have a mobile application installed associated with the financial institution. The mobile application may allow for mobile financial transactions and/or mobile payments. In various embodiments, separate applications may be installed to support financial transactions and mobile payments.

The smartphone device 130 may be associated with a customer 131. The customer 131 may have one or more accounts with the financial institution. For example, the customer 131 may have one or more credit accounts with the financial institution. The smartphone device 130 may alternatively be a laptop computer, a personal digital assistant, a tablet device, a smartwatch, smart glasses, or other computing devices capable of sending or receiving network signals. The smartphone device 130 may have an application installed that is associated with the financial institution. For example, the smartphone device 130 may have a mobile application installed associated with the financial institution. The mobile application may allow for mobile financial transactions and/or mobile payments. In various embodiments, separate applications may be installed to support financial transactions and mobile payments.

It should be appreciated that while two customers, 121 and 131, are depicted in FIG. 1, in various embodiments, the system 100 may have a single customer, such as customer 121 or 131. In various embodiments, customers 121 and 131 may be the same customer. In various exemplary embodiments, the system 100 may have a plurality of customers, beyond the two customers depicted. Each customer may have at least one associated mobile device, such as, for example, a tablet computing device and/or a smartphone. In various embodiments, each customer may have more than one mobile device, such that mobile devices 120 and 130 are merely representative of more than one mobile device. Each mobile device may have one or more applications associated with the financial institution installed thereon. Each customer may interact with the system 100 in the manner described herein.

In various embodiments, the mobile devices may have a token set corresponding to a payment account. The token may be provisioned by the financial institution over the network 110 to the mobile device. During a transaction, the network 110 may receive the token from the point of sale device 160 and/or the mobile device and may route the transaction to the financial institution (or a third party), which may then determine the account with which the token is associated and apply appropriate processing. The server 140 may perform processing of the transaction data and perform the mapping of the token.

The server 140 may perform operations associated with processing information and data associated with the tablet device 120 and/or the smartphone device 130. The server 140 may comprise one or more servers and/or computers, each having one or more computer processors associated therewith. In various exemplary embodiments, the server 140 may be a specific computing device to support exemplary embodiments as described herein. The server 140 may process information and data associated with the various accounts, applications, and tokens associated with the customers 121 and 131.

The server 140 may be communicatively coupled with the database 150. The database 150 may contain data and information used by the system 100. For example, the database 150 may store payment account data for customers 121 and 131, as well as customer profile data. The database 150 may store and manage token data associated the devices 120 and 130, including account authorization limits set by the customers 121 and 131. The database 150 may also contain additional information related to the operation and administration of the system 100. The database 150 may include any suitable data structure to maintain the information and allow access and retrieval of the information. For example, database 150 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The database 150 may be any suitable storage device or devices. The storage may be local, remote, or a combination thereof with respect to the database 150. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database 150 may have back-up capability built-in. Communications with the database 150 may be over a network, such as network 110, or communications may involve a direct connection between the database 150 and the server 140, as depicted in FIG. 1.

The point of sale device 160 may be associated with a merchant. The merchant may have a relationship with the financial institution such that the point of sale device 160 may be communicatively coupled, through the network 110, with the server 140 and the database 150. In various exemplary embodiments, the point of sale device 160 may be a server associated with an e-commerce website through with customer's conduct on-line transactions. In various exemplary embodiments, the point of sale device 160 may be a physical device located at a merchant's location. The point of sale device 160 may support mobile payments using the application(s) installed on the devices 120 and 130.

Figure 2:
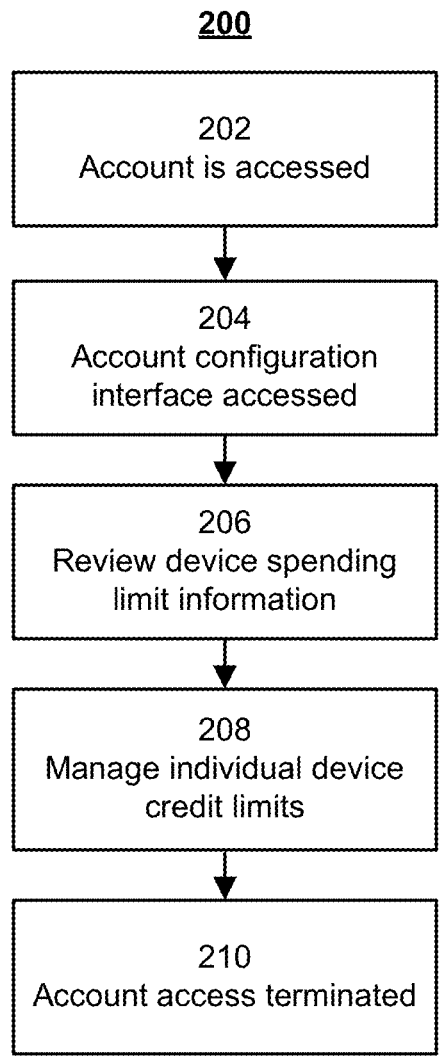
FIG. 2 is a flow chart of a method of setting individual mobile device spending limits for the same account in accordance with an exemplary embodiment.

Referring to FIG. 2, an exemplary method 200 is depicted. Exemplary method 200 may begin at block 202.

At block 202, an account is accessed. The access may be through a mobile application or through a website or other portal. The access may be by an account holder. For example, an account holder may log into a website associated with a financial institution. The account holder may have one or more accounts with the financial institution. The access may be through a secure site or portal. The account holder may be the primary account holder. The primary account holder may have a specific privileges and access to the account tied to their login identity. The account holder may have one or more payment accounts with the financial institution. The payment accounts may have a transaction instrument associated therewith. For example, each payment account may have a physical card or token associated therewith. The payment accounts may be credit or debit accounts.

The account holder may have one or more payment accounts provisioned to one or more mobile devices. As part of the provisioning a token may be used. That is, a token may be set on the mobile device such that the mobile device has a unique token id corresponding to each payment account. For example (which will be used throughout this method), the account holder may have three mobile devices—a tablet computing device, and two cell phones. Each may have a token id provisioned thereon corresponding to a credit account held by the account holder.

At block 204, an account management or configuration interface is accessed. The account configuration interface may allow for the management of spending authorization limits for each mobile device to which each account is provisioned.

At block 206, device spending limit information is presented. The account holder may be provided with a listing of each payment account and each mobile device to which it is provisioned. For example, a listing of the credit account and each mobile device it is set on is provided. The pending limit information for the credit account and each mobile device is provided. For example, the specific spending limit set for each device is provided as well as the overall spending limit for the account. The usage of the particular mobile device for the current billing period may be displayed. For example, the usage (that is, transactions conducted) for each mobile device may be displayed for comparison to the device's spending limit. This may allow the account holder to effectively manage the credit limits for each mobile device.

At block 208, individual device spending limits are managed. The account holder can set/edit individual device spending limits. A spending limit for each device can be independently set that differs from the overall spending or credit limit for the account. For example, the account holder can set a different spending limit for each mobile device associated with the credit account. A spending limit for an individual device can be no higher than the overall credit limit for the account. In exemplary embodiments, if no spending limit is set by the account holder for a particular device, the overall credit limit for the account will be applied to that particular device. This may be a default configuration At block 210, the account holder logs out. Any changed information may be saved. For example, updates to the spending limits may be saved. The financial institution may associate the spending limits for each device with the token set on that particular mobile device for later comparison during transaction processing.

Figure 3:
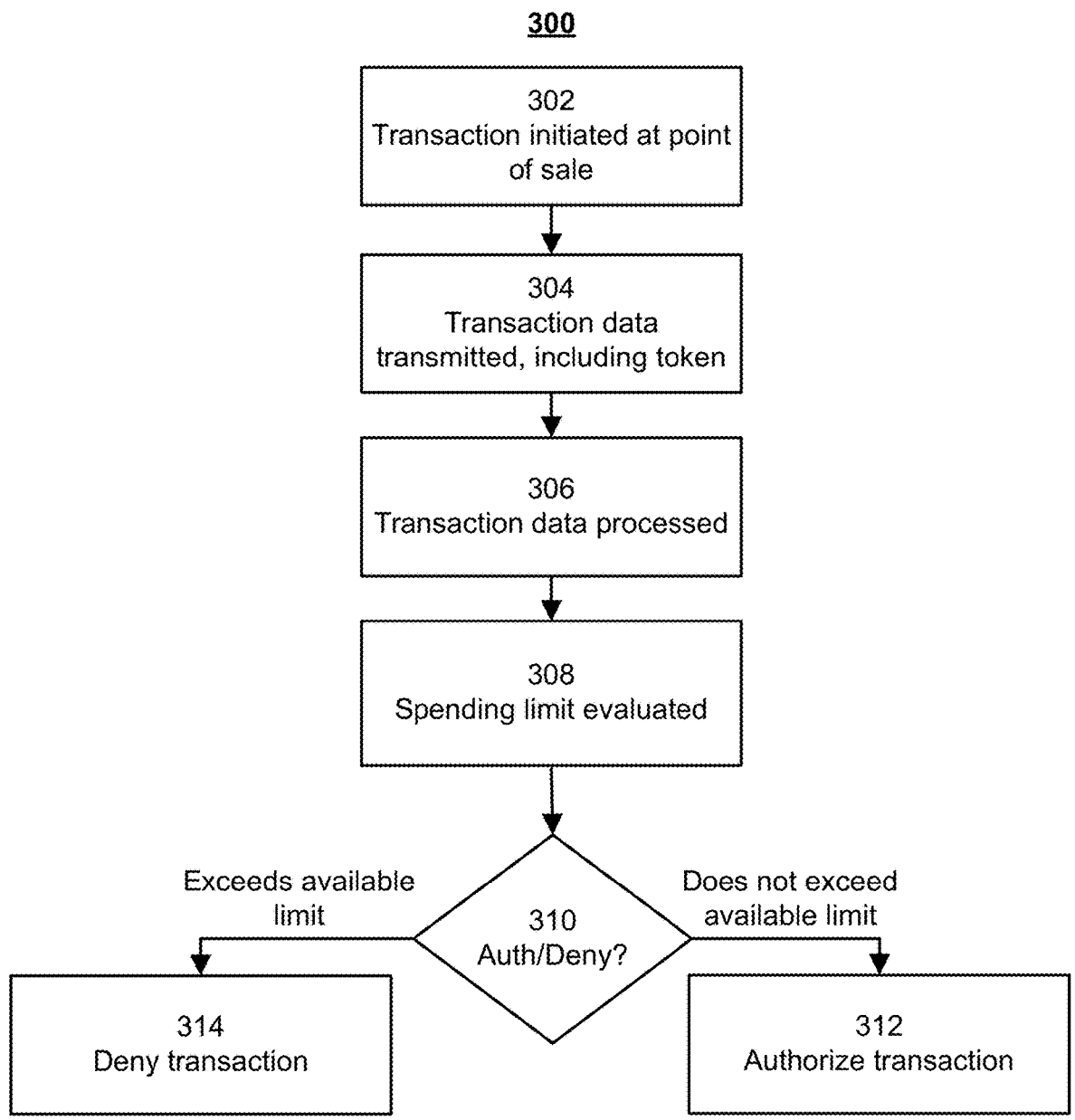
FIG. 3 is a flow chart of a method of processing a transaction with a mobile device spending limit in accordance with an exemplary embodiment.

Referring to FIG. 3, an exemplary method 300 is depicted. Exemplary method 300 may begin at block 302.

At block 302, a transaction is initiated at a point of sale. The point of sale may be a point of sale device in a physical (brick & mortar) store or the point of sale may be a checkout on a website or virtual storefront or e-commerce site. The transaction may be paid for as a mobile payment using a mobile device. The mobile device may have a token provisioned thereon associating the device with a payment instrument, such as a credit account. As part of initiation of the transaction, the token may be provided from the mobile device to the point of sale. The token may be provided electronically through a wireless interface (e.g., Near-Field Communications (NFC) or the like) or manually through entry into an appropriate location at the point of sale (e.g., entered into a payment information field at a website).

At block 304, transaction data is transmitted. The token id is included. The transaction data may include the price information for the transaction. The transaction data is transmitted over a network (e.g., the Internet or a payment network). The transaction data eventually is transmitted to the financial institution that is associated with the payment instrument (e.g., the issuing bank). The transaction data may be transmitted by the point of sale device. In various embodiments, depending on the transaction, the token id may be transmitted by the mobile device.

At block 306, the transaction data is processed. The financial institution processes the financial data, including the token to determine the particulars of the transaction.

At block 308, the spending limit is evaluated. Based on the token information, which is mapped by the financial institution to a particular payment account and a particular mobile device, the spending limit is evaluated vis-à-vis the transaction data. For example, the existence of a spending limit for the mobile device is determined, the available portion of that spending limit is evaluated, and the cost of the transaction vis-à-vis the remaining spending limit of the device is evaluated.

At blocks 310, whether to authorize or deny the transaction is determined based on the spending limit evaluation.

At block 312, if the transaction does not exceed the available spending limit, then the transaction is authorized.

At block 314, if the transaction exceeds the available spending limit, then the transaction is declined.

It should be appreciated that the transaction may be evaluated for a variety of other factors, which may lead to approval or denial of the transaction beyond the evaluation of the credit limit described herein.

Figure 4:
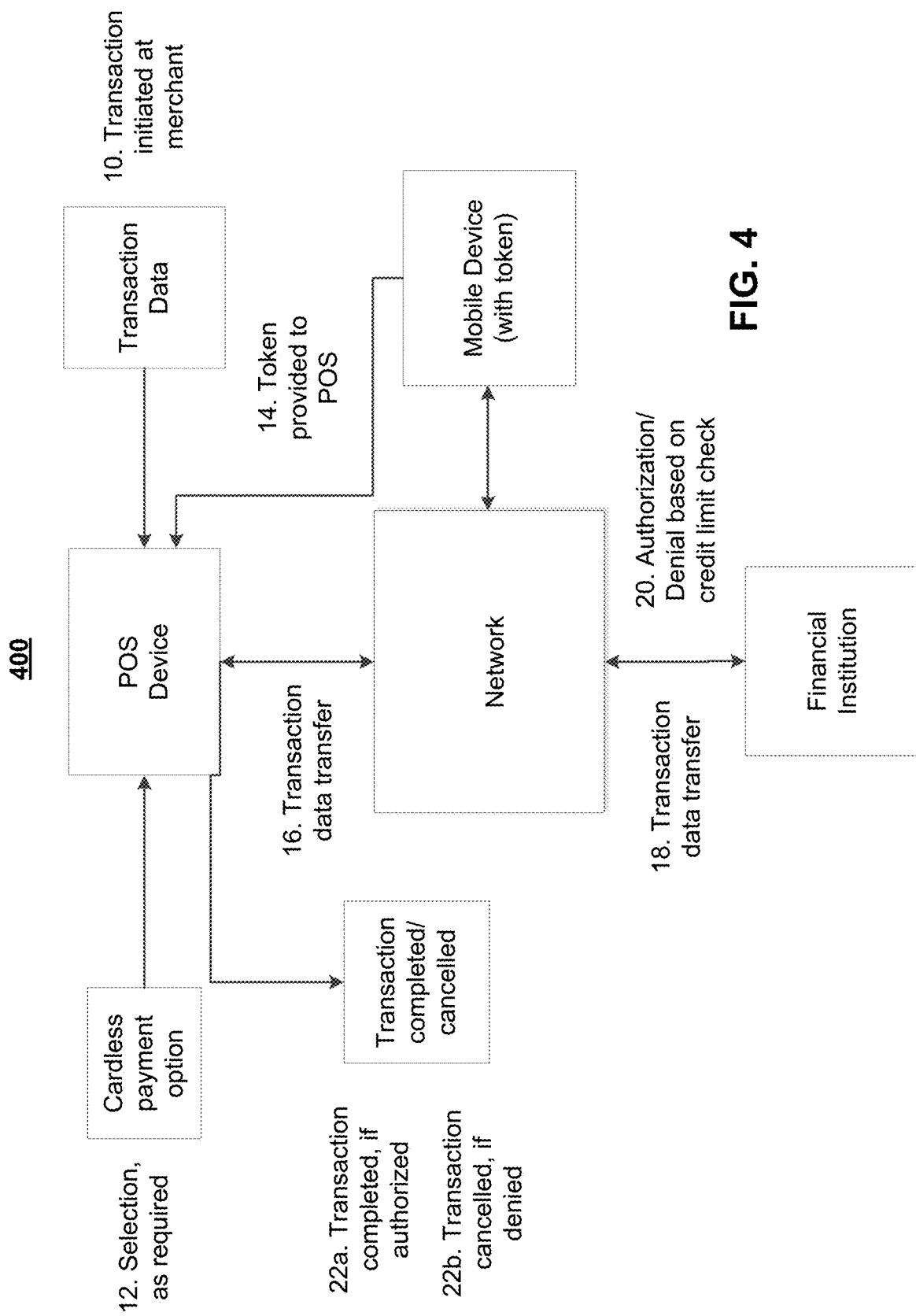
FIG. 4 is a flow chart of a method for using a mobile device at a point of sale device for a mobile payment in accordance with an exemplary embodiment.

Referring to FIG. 4, a flow chart of a method of conducting a cardless transaction using a mobile device according to exemplary embodiments is depicted.

As depicted in the method 400, at 10, a transaction is initiated at a merchant. The transaction may be initiated by a customer and/or a merchant. The transaction may be for the purchase of goods or services. Transaction data, such as the price for the goods and/or services, is input to a point of sale device. The point of sale device may be a physical point of sale device or a virtual point of sale device (e.g., check out from a website). At 12, a cardless payment option is selected if required. In various embodiments, a cardless payment option may be selected at the point of sale device, either by the customer or by the merchant. In various embodiments, this selection may not be required. At 14, token information is transferred from the mobile device to the point of sale device. The mobile device has at least one provisioned token thereon that corresponds to a payment account. For example, the payment account may be a credit account or a debit account. This transfer of the token information (e.g., the token id) is performed wirelessly. For example, NFC may be used. At 16, transaction data, including the token information and cost, is transmitted from the point of sale device to a network. In various embodiments, the token information may be transmitted from the mobile device to the network. The network may be the Internet or a payment network. The transaction data may be encrypted or otherwise secured for the transmission. At 18, the transaction data is received by the financial institution. The transaction data may be routed through one or more third parties before reaching the financial institution. For example, a payment processor may receive the transaction data and forward it to the financial institution. The financial institution may be the issuing bank of the payment account used for the transaction. The financial institution processes the transaction data, including mapping the token id to its corresponding payment account. A check is made for available spending limit and comparison of the available spending limit to the transaction cost. The spending limit may have been set in advance of the transaction to a particular limit that is less than the overall credit or spending limit associated with the payment account. At 20, an authorization or denial for the transaction is transmitted from the financial institution to the network for routing to the point of sale device. At 22*a*, the transaction is completed if authorized. At 22*b*, the transaction is cancelled if denied. The authorization or denial is based on the evaluation of the transaction compared to the available spending limit for the particular mobile device used for the transaction.

Hereinafter, physical aspects of implementation of the exemplary embodiments will be described. As described above, exemplary methods may be computer implemented as a system. The system or portions of the system may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, mobile devices/portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process.

It is appreciated that in order to practice the methods as described above, it is not necessary that the processors and/or the memories of the processing machine be physically located in the same geographical place. For example, each of the processors and the memories and the data stores used may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with further embodiments, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions. It is also appreciated that the data storage performed by two distinct components as described above may, in accordance with a further embodiment, be performed by a single component. Further, the data storage performed by one distinct component as described above may be performed by two distinct components.

Further, various technologies may be used to provide communication between the various processors and/or memories, as well as to allow the processors and/or the memories of the various exemplary embodiments to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of various exemplary embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the various exemplary embodiments may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various exemplary embodiments. Illustratively, the programming language used may include assembly language, ActionScript, Ada, APL, Basic, C, C++, C#, COBOL, Ceylon, Dart, dBase, F #, Fantom, Forth, Fortran, Go, Java, Jquery, Modula-2, .NET, Objective C, Opa, Pascal, Prolog, Python, RUM Ruby, Visual Basic, X10, and/or JavaScript, for example. Further, it is not necessary that a single type of instructions or single programming language be utilized in conjunction with the operation of the system and method of various exemplary embodiments. Rather, any number of different programming languages may be utilized as is necessary or desirable.

Also, the instructions and/or data used in the practice of the various exemplary embodiments may utilize any compression or encryption technique or algorithm, as may be desired. An encryption module might be used to encrypt data. Further, files or other data may be decrypted using a suitable decryption module, for example.

As described above, various exemplary embodiments may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of media or medium. For example, the particular medium, e.g., the memory in the processing machine, utilized to hold the set of instructions and/or the data used may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the system.

Further, the memory or memories used in the processing machine that implements the various exemplary embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the various exemplary embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is contemplated that the user interface might interact, e.g., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

While the embodiments have been particularly shown and described within the framework of mobile devices and mobile applications, it will be appreciated that variations and modifications may be effected by a person of ordinary skill in the art without departing from the scope of the various embodiments. Furthermore, one of ordinary skill in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A method, comprising:
   in an information processing apparatus comprising at least one computer processor:
   setting, on a first mobile device, a first token id corresponding to a payment account of a financial institution that maps the first token id to the payment account, the first token id being bound to the first mobile device and being stored in a secure memory of the first mobile device;
   setting, on a second mobile device, a second token id corresponding to the payment account that maps the second token id to the payment account, the second token id being bound to the second mobile device and being stored in a secure memory of the second mobile device, wherein the first token id and the second token id are unique to the first mobile device and the second mobile device, respectively;

receiving a configuration, from the account holder, of an account spending limit for the first mobile device;

associating the account spending limit with the first token id;

receiving a transaction request comprising an amount and a received token id from a point of sale device of a merchant, the transaction request being generated in response to receiving the received token id from the first mobile device or second mobile device via a wireless Near Field Communication (NFC) interface of the point of sale device;

identifying the first or second mobile device based on the received token id from the merchant;

retrieving the configured account spending limit for the identified mobile device;

comparing the transaction request amount against the configured account spending limit; and authorizing the transaction request upon the transaction request amount being less than the configured account spending limit or denying the transaction request upon the transaction request amount exceeding the account spending limit.

2. The method of claim 1, wherein the payment account comprises one of a debit or credit account.

3. The method of claim 1, wherein the first token id or the second token id comprises a 16-digit number.

4. The method of claim 1, further comprising:
upon denying the transaction request, receiving an override request from the account holder; and
authorizing the transaction request based on the override request.

5. The method of claim 1, further comprising:
applying a default account spending limit for the identified mobile device in the absence of the configured account spending limit being associated with the identified mobile device.

6. The method of claim 1, wherein the configuration of the account spending limit is received from one of a mobile application and a website.

7. A method, comprising:
in an information processing apparatus comprising at least one computer processor:
receiving a configuration, from an account holder, of an account spending limit for a first mobile device of two mobile devices, wherein the account spending limit is associated with a payment account of a financial institution; and
associating the account spending limit with a first token id that is set on the first mobile device, the first token id being bound to the first mobile device and being stored in a secure memory of the first mobile device;
wherein a second token id is set on the second mobile device, the second token id being bound to the second mobile device and being stored in a secure memory of the second mobile device, and wherein the first token id and the second token id both correspond to the payment account that maps the first id and second id to the payment account, and are unique to the first mobile device and the second mobile device, respectively;
identifying a mobile device as the first or second mobile device based on a token id received from a point of sale device of a merchant, the token id being transmitted from the mobile device to the point of sale device via a wireless Near Field Communication (NFC) interface of the point of sale device; and
determining if the account spending limit is associated with the first or second mobile devices.

8. The method of claim 7, further comprising:
associating a default account spending limit with the first token id in the absence of receiving the configuration of the account spending limit for the first mobile device.

9. The method of claim 7, wherein the received account spending limit configuration is received from one of a mobile application and a website.

10. The method of claim 7, wherein the payment account comprises at least one of a debit or credit account.

11. A method, comprising:
receiving a transaction request, comprising an amount and a first token id, from a server that provides an e-commerce website for merchant, the transaction request being generated in response a first mobile device transmitting the first token id to the server via the e-commerce website;
identifying the first mobile device from two mobile devices associated with an account used of a financial institution for the transaction request by mapping the account to the first token id, the first token id being bound to the first mobile device and being stored in a secure memory of the first mobile device;
wherein the first token id is set on the first mobile device and a second token id is set on a second mobile device, the second token id being bound to the second mobile device and being stored in a secure memory of the second mobile device, the first token id and the second token id identify the same account, and the first token id and the second token id are unique to the first mobile device and the second mobile device, respectively;
identifying an account spending limit associated with the first mobile device wherein the account spending limit was configured by an account holder prior to the transaction request;
comparing the transaction request amount against the account spending limit for the first mobile device; and
authorizing the transaction request upon the transaction request amount being less than the account spending limit or denying the transaction request upon the transaction request amount exceeding the account spending limit.

12. The method of claim 11, wherein the first token id or the second token id comprises a 16-digit number.

13. The method of claim 11, wherein the first token id or the second token id corresponds to a payment account comprising one of a debit or credit account.

14. The method of claim 11, further comprising:
upon denying the transaction request, receiving an override request from the account holder; and
authorizing the transaction request based on the override request.

* * * * *